United States Patent

[11] 3,609,498

| [72] | Inventors | John H. Andresen, Jr.<br>Hewitt, N.J.;<br>James A. Fitzpatrick, Bayside, N.Y. |
|---|---|---|
| [21] | Appl. No. | 882,684 |
| [22] | Filed | Dec. 5, 1969 |
| [45] | Patented | Sept. 28, 1971 |
| [73] | Assignee | Intercontinental Dynamics Corporation<br>Englewood, N.J. |

[54] CONVERTER FOR POSITIONING A CONTINUOUSLY ROTATABLE SHAFT UTILIZING CYCLIC DIGITAL INFORMATION
7 Claims, 2 Drawing Figs.

| [52] | U.S. Cl. | 318/665 |
|---|---|---|
| [51] | Int. Cl. | G05b 1/06 |
| [50] | Field of Search | 318/665 |

[56] References Cited
UNITED STATES PATENTS

| 3,196,429 | 7/1965 | Gross et al. | 318/28 X |
|---|---|---|---|
| 3,254,283 | 5/1966 | Hunt | 318/29 |

Primary Examiner—Benjamin Dobeck
Attorney—Ostrolenk, Faber, Gerb & Soffen

ABSTRACT: A servomechanism for converting cyclic digital information to a continuously rotating shaft position is controlled by an error signal derived by comparing the voltage analog of the cyclic digital information and the voltage obtained from a selected one of two potentiometers, both of which have wiper arms which rotate in unison with the continuously rotating shaft. A level comparator controlled by signals from the converter which changes the digital information to an analog signal is used to select which potentiometer is connected to the servoamplifier.

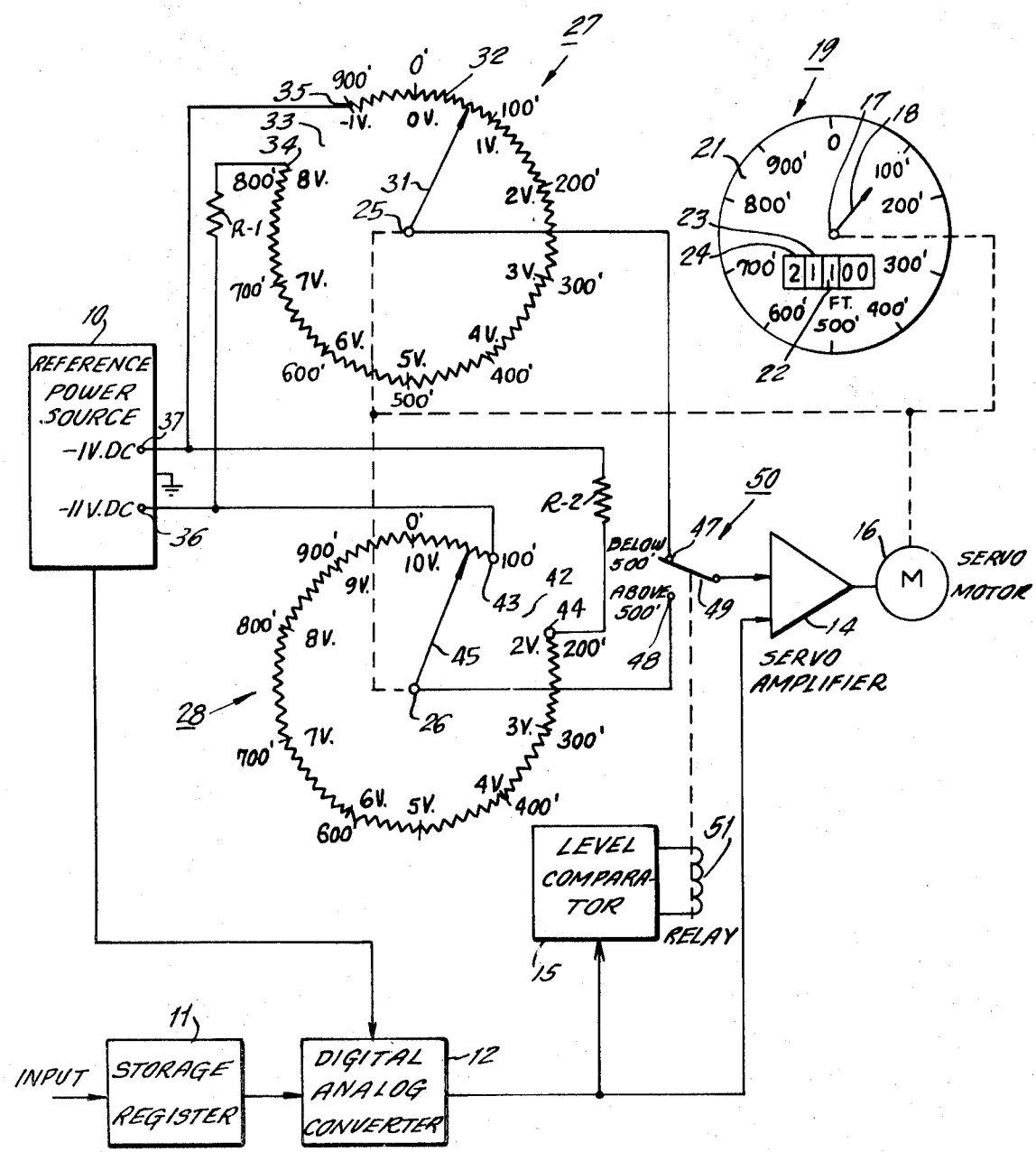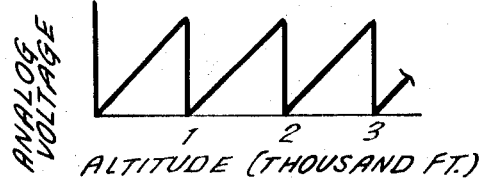

CONVERTER FOR POSITIONING A CONTINUOUSLY ROTATABLE SHAFT UTILIZING CYCLIC DIGITAL INFORMATION

This invention relates to shaft-positioning means in general, and more particularly to a servomechanism which utilizes cyclic digital information to position a continuously rotatable shaft.

It has been found convenient to utilize digital information generated by an air data computer to control operation of altimeters and other air data instruments. However, certain problems have arisen by virtue of the fact that an altimeter pointer is continuously rotatable, so that unless special precautions are taken, the servomechanism driving the pointer may fail to respond to all input signals, especially when direction of movement for the pointer is to be changed.

Accordingly, a primary object of the instant invention is to provide an improved construction for a servomechanism operating an altimeter indicator.

Another object is to provide an improved dual followup potentiometer arrangement in a servo circuit, together with an automatic switch to determine which potentiometer is active in the servo circuit at any instant.

These objects as well as other objects of this invention will become readily apparent after reading the following description of the accompanying drawings in which:

FIG. 1 is a schematic of an air data system constructed in accordance with the teachings of the instant invention.

FIG. 2 is a graph illustrating the output of the analog converter.

Now referring to the figures. The air data system of FIG. 1 receives an input from an air data computer (not shown) in conventional serial binary-coded decimal form. Typically, the least significant bit is equal to 1 foot, with information for altitude in the range of from 0 to 999 feet being encoded by four bits for each decimal digit, or 12 bits of information. These 12 least significant bits repeat as altitude continuously increases from 1,000 to 1,999; 2,000 to 2,999; 3,000 to 3,999; etc. The serial information input is fed to a digital storage register 11, where the input is stored in parallel form until the next sequence of 12 bits representing updated altitude information is received. Digital analog converter 12 converts the parallel information to a DC analog voltage, whose ratio to a relatively fixed reference voltage supplied by source 10 is directly proportional to the applied digital information representing altitude. This DC analog voltage is shown graphically in FIG. 2. Typically, converter 12 includes a ladder network to produce the analog output voltage from the input parallel digital information.

The analog voltage from converter 12 is fed to servoamplifier 14 and to level comparator 15, for reasons which will hereinafter be explained. Servoamplifier 14 controls the operation of motor 16, which drives shaft 17 to which pointer 18 of altimeter indicator 19 is keyed. Pointer 18 moves in front of dial face 21 which is marked with a scale indicating 0 to 999 feet. Digit-carrying hundreds drum 22 is directly driven by shaft 17, with the other digit-carrying drums 23, 24 for higher significant figures being intermittently connected to drum 22 in a manner well known to the art. Motor 16 also drives shafts 25, 26 of potentiometers 27, 28 respectively.

Wiper arm 31 is driven by shaft 25 in contact with resistance element 32 which is circularly arranged about shaft 25 as a center. Shaft 25 also drives wiper arm 31 across gap 33, formed between the spaced ends 34, 35 of element 32. End 34 is connected through resistor R-1 to the +11-volt terminal 36 of source 10 and end 35 is connected directly to the −1-volt terminal 37 of source 10.

Potentiometer 28 includes resistance element 41, circularly arranged about shaft 26 as a center and having gap 42 between ends 43, 44 thereof. End 43 is connected directly to source terminal 36, while end 44 is connected through resistor R-2 to source terminal 37. Shaft 26 drives wiper arm 45 across gap 42 and in engagement with resistance element 41. Wipers 31 and 45 are electrically connected to spaced contacts 47, 48, respectively, of single-pole double-throw switch 50. Movable contact 49 of switch 50 is electrically connected to servoamplifier 14 and is movable into and out of engagement with stationary contacts 47, 48 under the influence of solenoid 51, whose energization is controlled by level comparator 15.

In the system of FIG. 1, output shaft 17 drives pointer 18 of altimeter 19 through 360° for each 1,000 feet of altitude change. Resistive potentiometer elements 32 and 41 are so phased that for clockwise rotation wiper 31 of potentiometer 27 maintains contact with element 32 from the 900-foot position (indicated on the outside of element 32) through 0 feet to 800 feet, while wiper 45 of potentiometer 28 maintains contact with element 41 from 200 feet through 0 feet to 100 feet. DC voltage levels for various angular locations along resistance elements 32 and 41 are shown on the inside thereof.

The analog voltage produced by converter 12 increases linearly from 0 to +10 volts as altitude information goes from 0 to 999 feet. Level comparator 15 is set to change state (operate switch 50) when the analog voltage signal crosses the 5-volt level (level equivalent to 500 feet). When the analog signal (FIG. 2) is below 500 feet, solenoid 51 connects wiper 31 to amplifier 14, and when the analog signal is above 500 feet, wiper 45 is connected to amplifier 14. Amplifier 14 controls the operation of motor 16, in accordance with an error signal derived by comparing the analog voltage output of converter 12 with the voltage appearing at the particular wiper 31, 45 that is connected to amplifier 14. If the analog voltage is greater than the voltage at the wiper connected to amplifier 14, motor 16 is energized to drive the pointer 18 and wipers 31 and 45 clockwise until the servo error signal is reduced to 0, at which time motor 16 is deenergized. Conversely, if the analog voltage is less than the voltage on the wiper connected to servo 14, motor 16 drives in a counterclockwise direction until the error signal is reduced to 0.

At the digital transition point, where the count goes from 999 to 0, the overlapping orientation of the potentiometer resistance elements 32, 41 provides smooth motion for pointer 18. More particularly, when the count is 999, switch 50 operated by level comparator 15 connects wiper 45 to amplifier 14. As the count jumps to 0, level comparator 15 causes switch 50 to operate and connect wiper 31 to amplifier 14. Since the analog voltage is now 0 volts, servo motor 16 remains stationary, with wiper 31 at the equivalent of 0 volts. Reverse action occurs at the transition from 0 to 999.

In the embodiment illustrated, reference voltages of −1 volt and +11 volts are selected so that in combination with end resistors R-1 and R-2, a scale factor of 10 volts per 1,000 feet is maintained, this being equal to the analog voltage scale factor. However, it is noted that end voltages of only slightly more than +10 volts DC for the high end of resistance element 41 and slightly negative (below 0 volts DC) for the low end of resistance element 32 are required. These over and under voltages allow for a small amount of misalignment, which is to be expected between the potentiometers 27, 28. That is, if at the transition from 999 to 0, wiper 31 is located slightly to the left of the 0 foot point, the minus 1-volt supply will provide a negative signal at wiper 31 which will drive the servo to the true zero point.

It should be apparent to those skilled in the art that for an altimeter indicator digital information may be converted to analog information in units of 2 feet, 5 feet or 10 feet instead of in 1 foot units, in order to make the transition more positive and avoid any tendency to hunt. If 1-foot bits are used, hunting over the single-foot region will be so small as not to be visible at indicator pointer 18.

It should also be apparent to those skilled in the art that the servomechanism hereinbefore described may be used for many other applications were continuous shaft rotation is desired under control of cyclic digital data input. Such other applications include digitally programmed machine tools, remote controlled wheeled vehicles, antennas, lazer beams, searchlights, cameras, weapons, compass indicators, and aircraft auto pilots in each of their axes of control.

Although there has been described a preferred embodiment of this novel invention, many variations and modifications will now be apparent to those skilled in the art. Therefore, this invention is to be limited not by the specific disclosure herein but only by the appending claims.

The embodiments of the invention in which an exclusive privilege or property is claimed are defined as follows.

1. Apparatus for positioning a continuously rotatable shaft in accordance with a cyclic information input; said apparatus comprising a first potentiometer including a resistive first element having a first gap between the ends thereof, and a continuously rotatable first wiper movable across said first gap and said first element, in operative engagement with the latter; a second potentiometer including a resistive second element having a second gap between the ends thereof, and a continuously rotatable second wiper movable across said second gap and said second element, in operative engagement with the latter; a reference voltage source energizing said elements; means ganging said shaft together with shaft sections in driving engagement with said wiper arms; a converter for transforming said information input into an analog voltage; servo means; switching means operative to electrically connect one or the other of said wipers to said servo means responsive to the state of said analog voltage; each of said wipers when electrically connected to said servo means being in engagement with one of said elements; said servo means rotating said shaft to a position related to said information input in response to an error signal derived by comparing said analog voltage to the voltage at the one of said first and said second wipers that is electrically connected to said servo means; said gaps positioned within a predetermined angular range of movement for said wipers with said first gap being at one end portion of said range and said second gap being at the other end portion of said range; said switching means operative to effect switching action when said wipers are at approximately first and second angular positions, said first angular position being outside said range and said second angular position being within said range at a location between said end portions; said elements being energized by said reference voltage source in a manner such that corresponding angular positions on said elements outside said range are at equal potentials.

2. Apparatus as set forth in claim 1, in which said switching means includes a level comparator.

3. Apparatus as set forth in claim 1, in which the cyclic information input is in digital form.

4. Apparatus as set forth in claim 1, in which the potentials at first additional angular positions of said first element within said range are less than the lowest potential outside said range and potentials at second additional angular positions of said second element within said range being greater than the highest potential outside said range.

5. Apparatus as set forth in claim 4, in which said first and said second points are spaced by approximately 180°.

6. Apparatus as set forth in claim 5, in which said range is less than 180°.

7. Apparatus as set forth in claim 1, in which the cyclic information is in digital form and said range is less than 180°.